3,749,784
PSORIASIS TREATMENT
Irving S. Johnson, Indianapolis, Ind., assignor to Eli
 Lilly and Company, Indianapolis, Ind.
No Drawing. Continuation-in-part of abandoned application Ser. No. 84,199, Oct. 26, 1970. This application May 3, 1972, Ser. No. 249,926
Int. Cl. A61k 27/00
U.S. Cl. 424—262                  5 Claims

ABSTRACT OF THE DISCLOSURE

Psoriasis is treated topically, parenterally or orally with vincaleucoblastine (vinblastine, VLB) or leurocristine (vincristine).

CROSS REFERENCE

This application is a continuation-in-part of my copending application Ser. No. 84,199, filed Oct. 26, 1970, now abandoned.

BACKGROUND OF THE INVENTION

Psoriasis is a common chronic skin disease whose cause is unknown. It is characterized by persistent patches of redness covered with scales. The disease is in part determined by a genetically dominant trait. While it is absent at birth, it can begin at any age from childhood to extreme old age. Psoriasis does not, however, appear to be a communicable disease and there are no known causative factors for it in the environment.

In the involved patches, the cells of the epidermis grow and multiply up to seven times faster than normal. The agents currently used for treatment of psoriasis include ultraviolet light, coal tar, ammoniated mercury, anthralin, topical corticosteroids, and methotrexate. Other antimetabolite drugs such as aminopterin, thioguanine, and azaribine have also been used in treating this disease. Systemic corticosteroids or anti-malarial drugs such as chloroquin may aggravate the disease by mechanisms that are not understood. A low relative humidity also aggravates the disease, probably by allowing desiccation of the skin and irritation.

It would, of course, be desirable to employ a topical treatment for psoriasis, but according to Comaish and Juhlin, Arch. Dermatol. 100, 99 (1969) methotrexate, a drug of choice in severe cases, was not successful in treating psoriasis by the topical route. In fact, of the antimetabolite drugs, fluorouracil alone has been claimed to be effective in treating psoriasis by topical administration—see Z. Haut-Geschlechtskrankh 44, 361 (1969).

It is an object of this invention to provide new and effective treatment methods for psoriasis.

SUMMARY OF THE INVENTION

This invention provides a method of treating psoriasis in humans which comprises administering to a human suffering from psoriasis a compound of the formula:

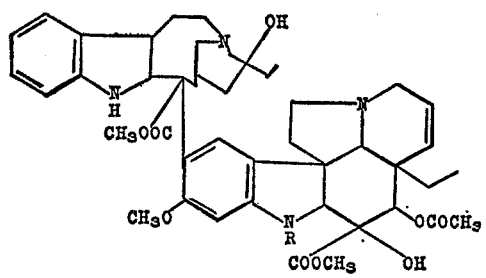

wherein R is methyl or formyl, or an acid-addition salt thereof with a pharmaceutically acceptable acid.

When R is methyl, the compound is known as vincaleucoblastine or VLB, generically vinblastine, and when R is formyl, the compound is known as leurocristine, generically vincristine.

Vinblastine and vincristine can be administered to psoriatic patients in a variety of ways, including topical, parenteral and oral administration.

For topical administration, a compound represented by the above formula, in the form of an acid-addition salt, preferably the sulfate salt or salt with another pharmaceutically acceptable acid such as hydrochloric acid or phosphoric acid, is formulated in an ointment or in a solution.

A typical ointment useful in applying a compound of the above formula to a psoriatic lesion contains the following ingredients per gram of ointment.

|  | Mg. |
|---|---|
| Vinblastine sulfate | 5 |
| Cetyl alcohol (NF) | 15 |
| Sorbitan sequioleate | 10 |
| White wax (U.S.P.) | 15 |
| White petrolatum (U.S.P.), q.s. to make 1.0 g. | |

A typical solution for topical use contains the following ingredients per gram:

|  | Mg. |
|---|---|
| Vinblastine sulfate | 5 |
| Glycerine (U.S.P.) | 995 |

For oral administration, vinblastine and vincristine can be formulated in tablets or gelatin capsules or in solution or suspension in aqueous media. A typical tablet prepared in a conventional manner contains the following ingredients:

|  | Mg. |
|---|---|
| Vinblastine sulfate | 25 |
| Lactose | 500 |
| Starch powder | 100 |
| Dicalcium phosphate anhydrous | 100 |
| Stearic acid | 25 |
| Magnesium stearate | 10 |

Suitable empty telescoping gelatin capsules for oral administration can each contain from 1 to 50 mg. of vinblastine sulfate and 500 mg. of starch thoroughly mixed or from 0.1 to 5 mg. of vincristine plus 500 mg. of starch.

Parenteral administration is accomplished with lyophilized vincristine (1 mg. of vincristine and 10 mg. of lactose per ampoule) mixed with a diluting solution containing 10 mg. of sodium chloride and 0.9 mg. of benzyl alcohol in 10 ml. of sterile water. Ampoules of vinblastine sulfate contain 10 mg. of lyophilized compound admixed with lactose, and a diluting solution as above. Alternatively, sterile water can be added to the ampoule contents just prior to use.

In carrying out my novel treatment method employing the topical route, vinblastine formulated as an ointment or solution as indicated above, is applied to a psoriatic lesion at a rate varying from .3 mcg. per square cm. of skin surface per day up to 30 mcg. per square cm. of skin surface per day until the psoriatic process is checked. The ointment or solution is applied daily for 14 days using a continuous occlusive dressing. The concentration of vinblastine can vary from 0.005%; with these concentrations a dose of 0.01 ml. per square cm. of skin surface readily supplies the amount of vinblastine specified above. In any event, the daily topical dose for a 70 kgm. person should not exceed about 0.3 mg. of vinblastine.

When vincristine is the active ingredient the dosage level should be about $\frac{1}{10}$ of that specified for vinblastine.

In the above formulations it has been stated that it is preferred to employ the alkaloid in the form of an acid-addition salt; however, the alkaloidal free base is also effective and in some cases is better absorbed through the skin than the salt. Formulations employed for the free base are substantially the same as those indicated above for the sulfate salt.

With parenteral administration, the intravenous route is preferred and the same dosage regimen is employed as for the approved use of vinblastine and vincristine in the palliation of neoplastic disease; i.e., a gradual daily dosage increment until a maximum dose, not exceeding 0.5 mg./wk. for vinblastine or 0.15 mg./wk. for vincristine, is reached. Dosage levels can also be reduced to the lowest effective level. Oral administration requires higher dosages, but the same tailoring of the dose level to the severity of the disease and the appearance of side effects is used as in intravenous administration.

Patients receiving from 7 to 18 mg./wk. of velban intravenously have shown partial improvement of their pre-existing psoriasis.

Other vinca alkaloids which are capable of arresting abnormally rapid cell division may be used in place of vinblastine or vincristine in my novel process. Such alkaloids inclde leurosine (generically vinleurosine) and leurosidine (generically vinrosidine).

I claim:
1. A method of treating psoriasis in humans comprising the application to the psoriatic lesion on the human from 0.3 to 30 mcg. per square centimeter of lesion surface of a compound of the formula:

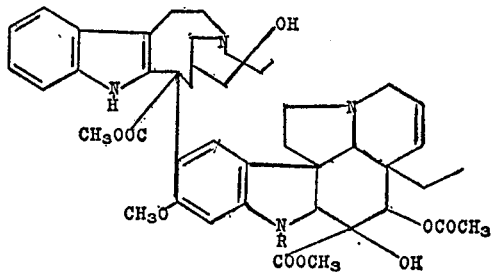

wherein R is methyl or formyl, or an acid-addition salt thereof with a pharmaceutically acceptable acid.

2. The method of claim 1, wherein the compound applied is vinblastine.

3. A method of treating psoriasis in humans comprising the administration to a human suffering from psoriasis of an effective dose for treating psoriasis of a compound of the formula:

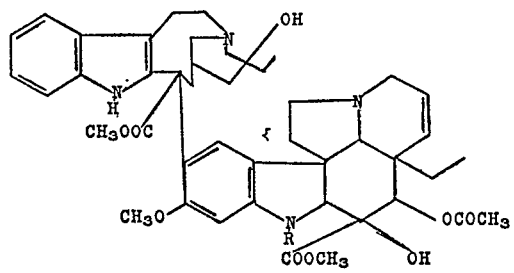

wherein R is methyl or formyl, or an acid-addition salt thereof with a pharmaceutically acceptable acid.

4. The method of claim 3 wherein the anti-psoriatic compound is vinblastine and the vinblastine is administered intravenously.

5. The method of claim 3 wherein the anti-psoriatic compound is vinblastine and the vinblastine is administered orally.

References Cited

The Merck Index, 8th edition, 1968, Merck & Co., Inc. Rahway, N.J., pp. 1107–1108.

JEROME D. GOLDBERG, Primary Examiner